United States Patent
Kendall et al.

(10) Patent No.: US 6,358,640 B1
(45) Date of Patent: Mar. 19, 2002

(54) FUEL CELL POWER GENERATING SYSTEM

(75) Inventors: Kevin Kendall, Shropshire; Ian Kilbride, Leicestershire, both of (GB)

(73) Assignee: Acumentrics Corporation, Westwood, MA (US)

( * ) Notice: Subject to any disclaimer, the term of this patent is extended or adjusted under 35 U.S.C. 154(b) by 0 days.

(21) Appl. No.: 09/230,228

(22) PCT Filed: Jun. 11, 1997

(86) PCT No.: PCT/GB97/01566

§ 371 Date: Aug. 17, 1999

§ 102(e) Date: Aug. 17, 1999

(87) PCT Pub. No.: WO97/48144

PCT Pub. Date: Dec. 18, 1997

(30) Foreign Application Priority Data

Jun. 13, 1996 (GB) ............................................. 9612389

(51) Int. Cl.⁷ .......................... H01M 8/04; H01M 8/06; H01M 8/18
(52) U.S. Cl. .............................. 429/26; 429/24; 429/34; 429/19
(58) Field of Search ............................... 429/26, 34, 24, 429/19

(56) References Cited

U.S. PATENT DOCUMENTS

| | | | | |
|---|---|---|---|---|
| 4,537,839 A | * | 8/1985 | Cameron | 429/20 |
| 4,650,727 A | | 3/1987 | Vanderborgh et al. | 429/19 |
| 5,968,673 A | * | 10/1999 | Aizawa et al. | 428/688 |
| 5,998,053 A | * | 12/1999 | Diethelm | 429/14 |
| 6,042,956 A | * | 3/2000 | Lenel | 429/17 |

FOREIGN PATENT DOCUMENTS

GB        1 309 517        4/1971

* cited by examiner

Primary Examiner—Gabrielle Brouillette
Assistant Examiner—Tracy Dove
(74) Attorney, Agent, or Firm—Bromberg & Sunstein LLP

(57) ABSTRACT

A small scale ceramic fuel cell system to which fuel gas is supplied through an injector which draws ambient air into the system. The air/fuel gas mixture is passed through a catalytic oxidation device which is thereby heated and heats a fuel cell. Air and fuel gas react at the fuel cell to generate an electrical output.

6 Claims, 1 Drawing Sheet

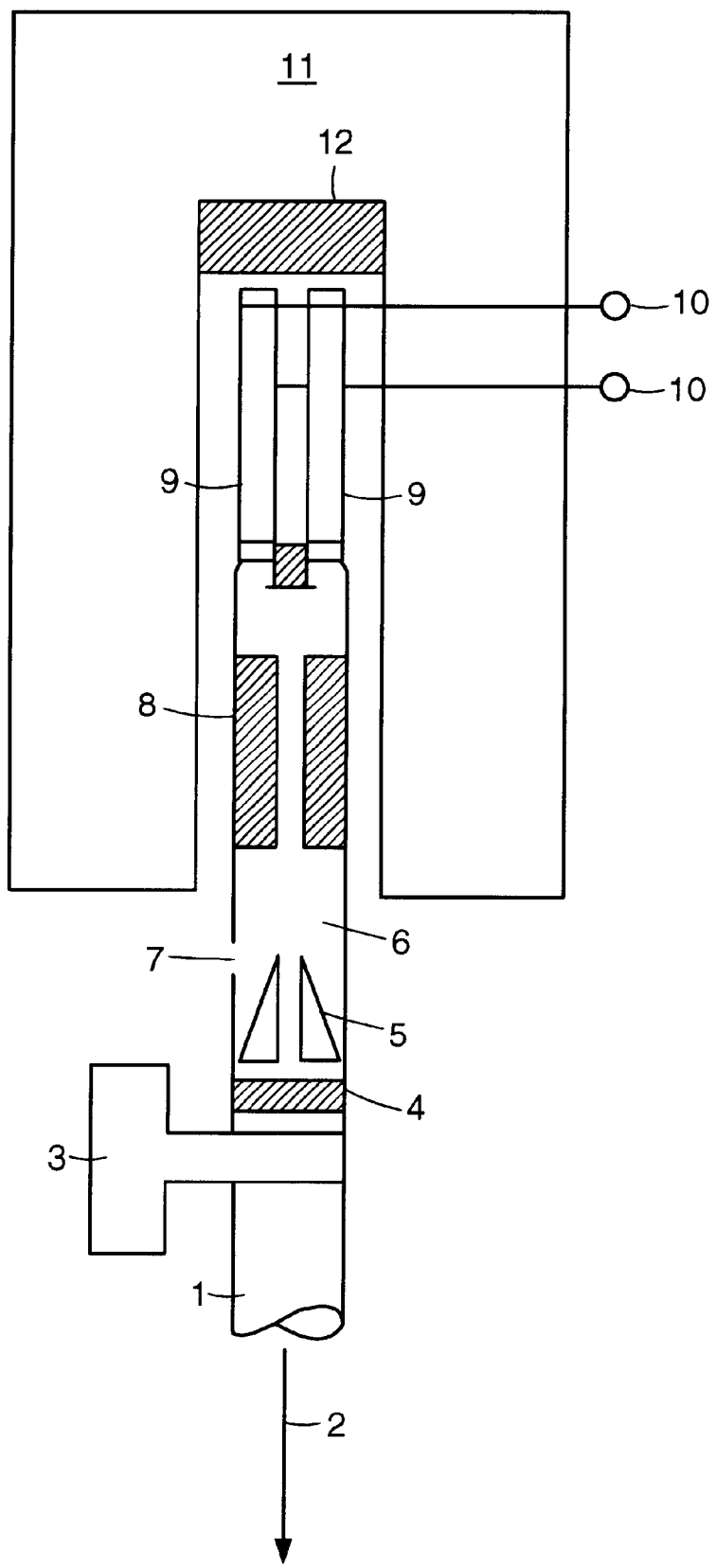

FUEL CELL POWER GENERATING SYSTEM

This application is a 371 of PCT/GB97/01566, filed Jun. 11, 1997.

The present invention relates to an electrical power source.

There are many circumstances in which it is necessary to be able to power electrical equipment for which there is no ready access to a main power supply. For example power supplies are required for communications equipment, electronic sensors and other devices, small motors and lights. Such devices typically require milliwatts or decawatts of power and in the past the only option in such circumstances has been the use of electrical batteries. Batteries require regular replacement which is a major disadvantage associated with their use.

Electronic sensors comprising ceramic electrolytes with electrodes made of platinum are known. Unfortunately, typically they produce only microwatts of power which is too small in many applications.

It is an object of the present invention to provide a fuel cell system suitable for replacing batteries as an electrical power source.

According to the present invention, there is provided an electrical power source comprising a fuel gas supply, means for delivering an air/fuel gas mixture to a catalytic oxidation device such that the catalytic oxidation device is heated by oxidation of fuel gas, a fuel cell located so as to be heated as a result of the heating of the catalytic oxidation device, and means for delivering air and fuel gas to the fuel cell, the fuel cell when heated and supplied with air and fuel generating an electrical output.

The power source may be supplied with fuel gas from a bottle or any other available source of fuel gas. The fuel gas supply may be connected to an injector arranged to draw ambient air into a conduit connected to the catalytic oxidation device, the air and fuel gas being mixed in the conduit. Preferably the catalytic oxidation device is connected in series with an upstream of the fuel cell in the conduit.

A further catalytic oxidation device may be provided downstream of the fuel cell to consume any residual fuel gas. The fuel cell may be defined by one or more ceramic tubes through which the fuel gas flows. Such tubes may be formed from zirconium oxide doped with yttria. The or each catalytic oxidation device may be formed from a porous mass of ceramic fibres supporting a platinum catalyst.

A sulphur absorbent filter may be provided upstream of the catalytic oxidation device, and the catalytic oxidation device and fuel cell may be located within a thermally insulating jacket.

BRIEF DESCRIPTION OF THE DRAWINGS

An embodiment of the present invention will now be described, by way of example, with reference to the accompanying drawing.

The drawing is a schematic representation of an embodiment of the invention which is capable of providing an output voltage of 0.5 volts and an output current of 30 mA. Fuel gas is supplied via a pipe 1 as indicated by arrow 2 from a bottle (not shown) of LPG or LNG. It will be appreciated that any gaseous hydrocarbon fuel could be used. The supply of gas is controlled by a valve 3 such that when the valve is open gas passes through a filter 4 and injector 5 into a conduit 6. The filter removes undesirable components such as sulphur which might disrupt the operation of the device. The filter may be for example a plug of glass fibre incorporating a molybdenum or other pellet capable of absorbing sulphur from the gas.

An aperture 7 is formed in the conduit 6. A fuel gas stream issuing from the injector 5 creates a venturi effect and therefore draws a controlled amount of ambient air into the conduit 6 through the aperture 7. The air and fuel gas is mixed within the conduit and then passes through a porous plug 8 of high surface area ceramic containing platinum catalyst. The fuel gas and air mixture reacts and as a result the plug 8 is heated, heating the gas passing through it and the remainder of the device. The plug 8, aperture 7 and the fuel gas flow rate are selected such that the gas emerging from the plug 8 is substantially free of oxygen.

The heated gas passes from the plug 8 into a pair of ceramic fuel cell tubes 9 connected to terminals 10. The tubes 9 and the portion of the conduit incorporating the catalyst plug 8 are located within an open-ended housing defined by an insulating body 11. Thus the rate at which heat leaks from the system is limited but the space defined within the insulated housing 11 is sufficient to enable air to defuse readily into the region around the tubes 9. Thus the tubes are maintained at a temperature sufficient for them to operate as fuel cells and a voltage is developed as a result of the electrochemical reaction between fuel gas within the tubes 9 and oxygen in the region around the tubes 9.

A further plug 12 of high surface area platinum-containing ceramic is positioned adjacent the open end of the tubes 9 such that any residual fuel gas emerging from the tubes 9 is further reacted. Thus substantially no fuel gas leaks from the assembly.

It will be appreciated that in the described device the assembly is self-heating to the required operating temperature for fuel cell operation and therefore does not require a separate heat source for establishing its operation. Furthermore it is not necessary to provide any external power supply nor supply pressurised air or oxygen.

The tubes 9 may be of the type described in International Patent Application No. GB94/00549. The preferred ceramic is zirconium oxide, doped with yttria to provide good ionic conductivity. However, other ceramic electrolytes can be used, including those containing ceria, gadolinia, and other oxide materials. Furthermore, other dopants could be used including scandia, magnesia and calcia. Several types of electrode and current collectors structures may be used for the tubes, for example one of those described in the above mentioned International Patent Application. Platinum is the preferred material for the electrodes because of its long lifetime, but alloys of platinum and other metals may be used. Gold and silver alloys are satisfactory under certain conditions. Perovskites such as lanthanum, strontium, manganite may be used on cathode surfaces defined by the tubes to improve performance. Lanthanum strontium chromite or other stable oxides may be used on anode electrode surfaces to improve performance.

The catalyst material used to define the plugs 8 and 12 could be made from high surface area saffil alumina fibre loaded with 5% by weight of platinum deposited from chloroplatinic acid. Alternatively, a metal mesh may be coated with platinum black to give a catalytic effect.

The filter 5 which removes potentially disruptive sulphur from the gas stream may be made of glass fibre incorporating molybdenum or other suitable pellets.

An example of the device illustrated in the accompanying drawing was prepared by impregnating saffil catalyst grade alumina fibre with $H_2PtC_{16}$ equivalent to 5% by weight of platinum. This was dried and heated in a reducing atmosphere to 600° C. 1 g of this catalyst material was rolled between metal meshes to form a tube which was placed in an alumina support tube. Natural gas was passed through an injector to draw air into the tube. The catalyst became hot and stabilised at 700° C. A zirconia fuel cell tube with Ag/Pd anode and lanthanum strontium manganite cathodes with silver wire current collectors was inserted into the hot zone downstream of the heated catalyst and was fed with natural gas. The fuel cell produced 0.5 Volts at 30 mA.

What is claimed is:

1. An electrical power source comprising a fuel cell and a first catalytic oxidation device located adjacent each other within a thermally insulating jacket such that heating of the first catalytic oxidation device results in heating of the fuel cell, means defining a gas flow passageway in which the first catalytic oxidation device and the fuel cell are connected in series, means for delivering a mixture of air and a fuel gas to the passageway such that the first catalytic oxidation device is heated by oxidation of the fuel gas and resultant oxygen-depleted gas is delivered directly to the fuel cell, and means for generating an electrical output as a result of combustion of the fuel gas in the fuel cell, wherein a fuel gas supply is connected to an injector arranged to draw ambient air into a conduit connected to the gas flow passageway, the air and fuel gas being mixed in the conduit.

2. A power source according to claim 1, wherein a second catalytic oxidation device is provided in the gas flow passageway downstream of the fuel cell.

3. A power source according to claim 1, wherein the fuel cell is defined by at least one ceramic tube.

4. A power source according to claim 3, wherein the or each tube is formed from zirconia oxide doped with yttria.

5. A power source according to claim 1, wherein the first catalytic oxidation device comprises a porous mass of ceramic fibres supporting a platinum catalyst.

6. A power source according to claim 1, further comprising a sulphur absorbent filter upstream of the first catalytic oxidation device.

* * * * *